Patented Sept. 15, 1925.

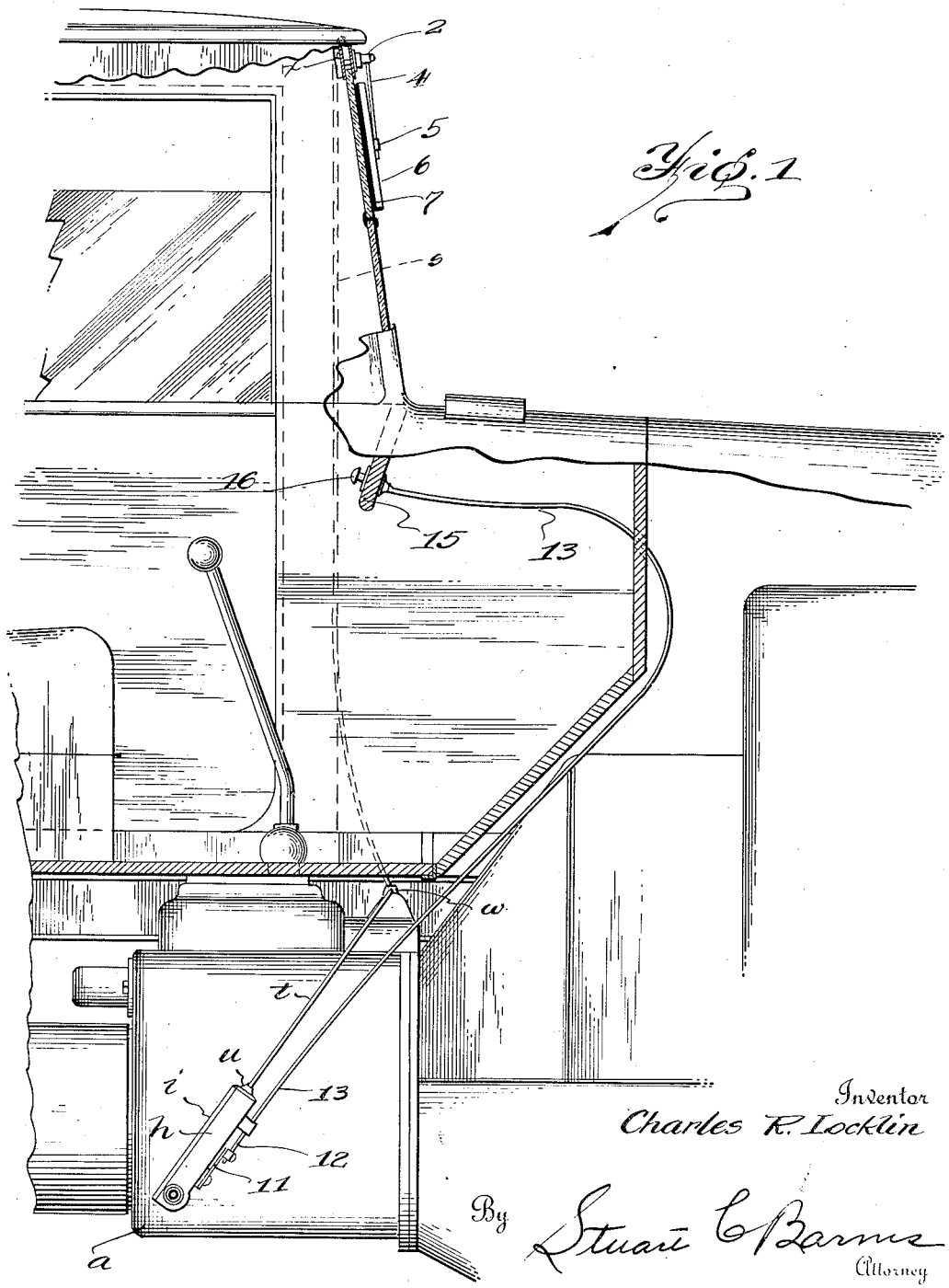

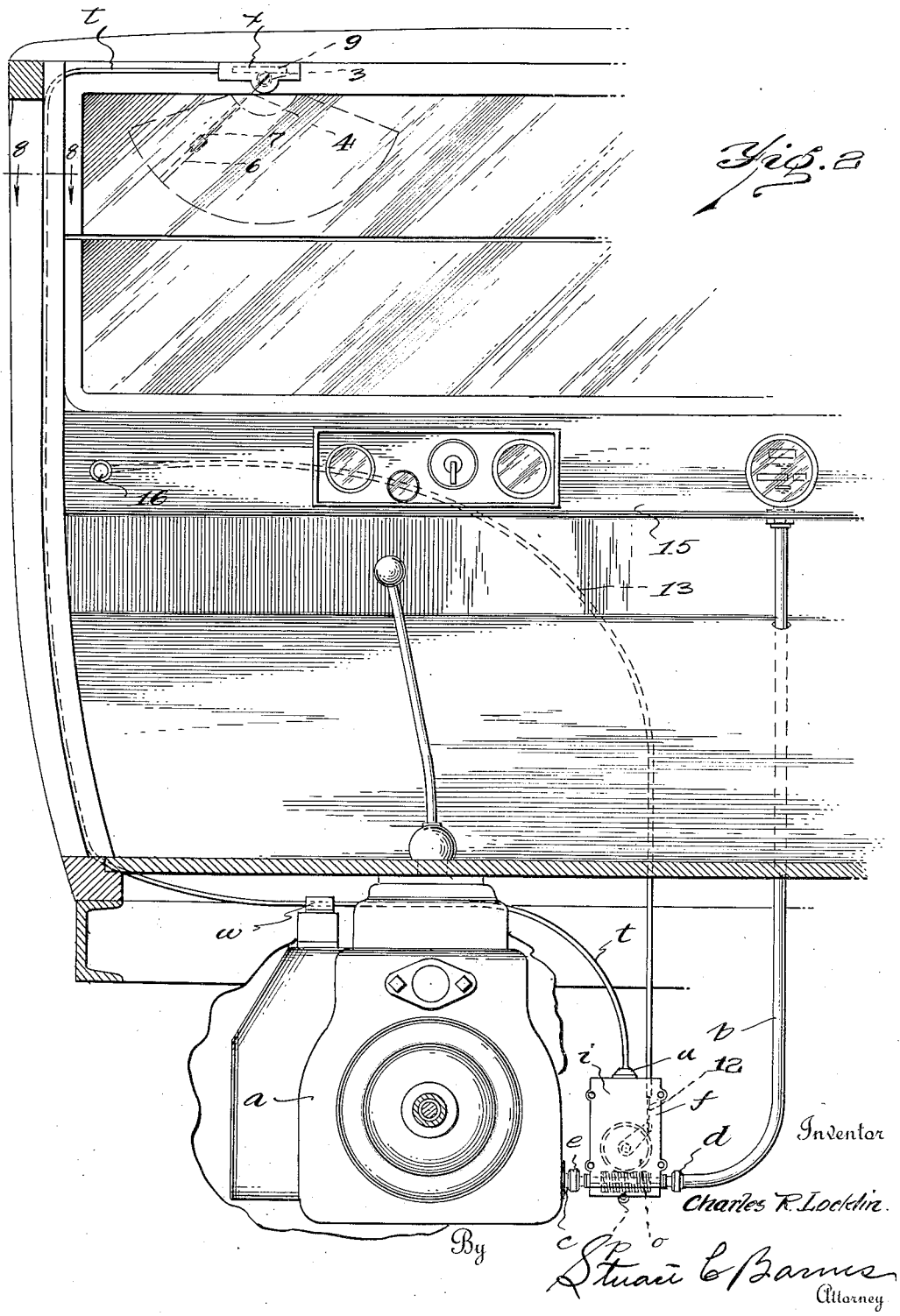

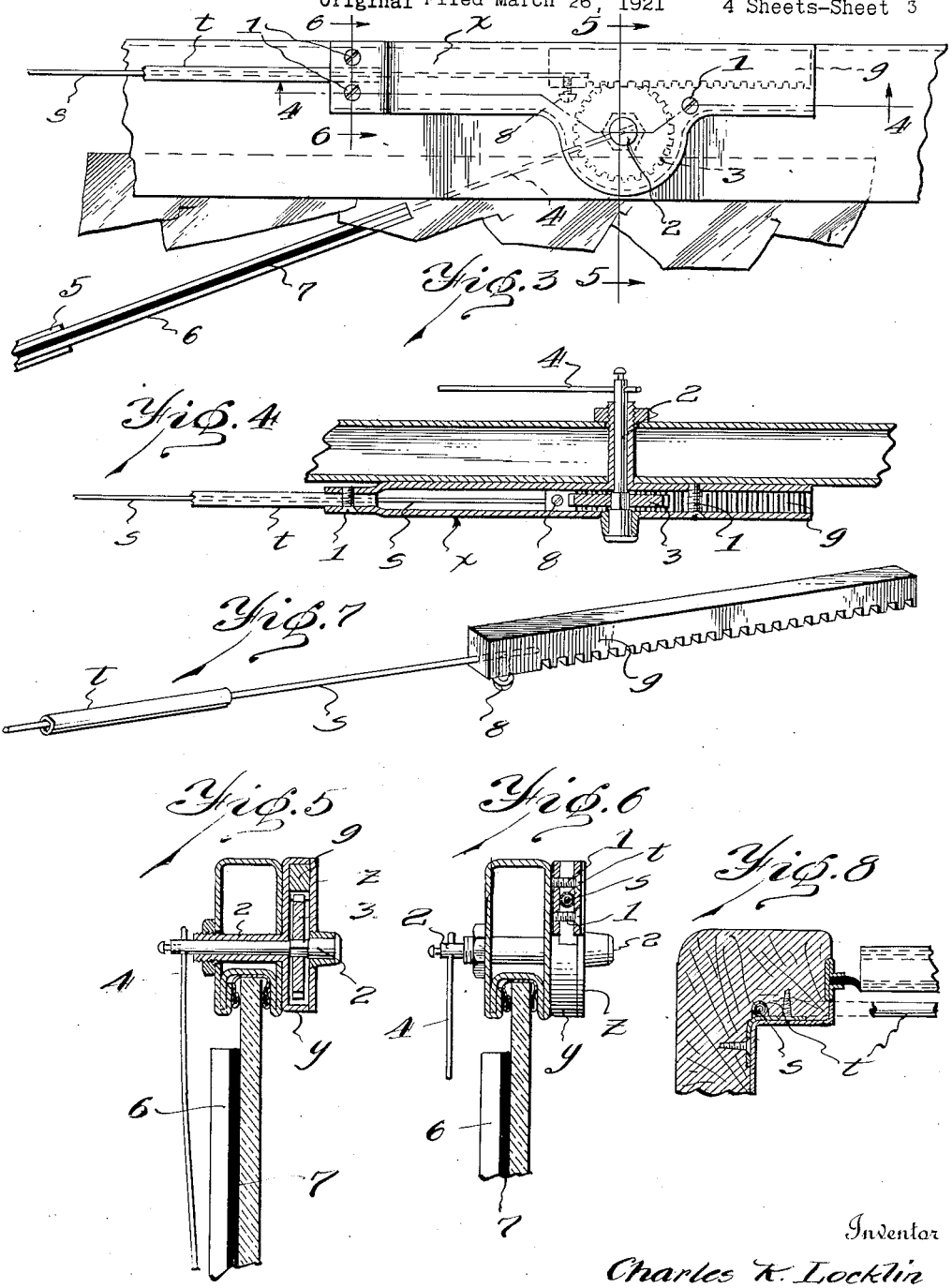

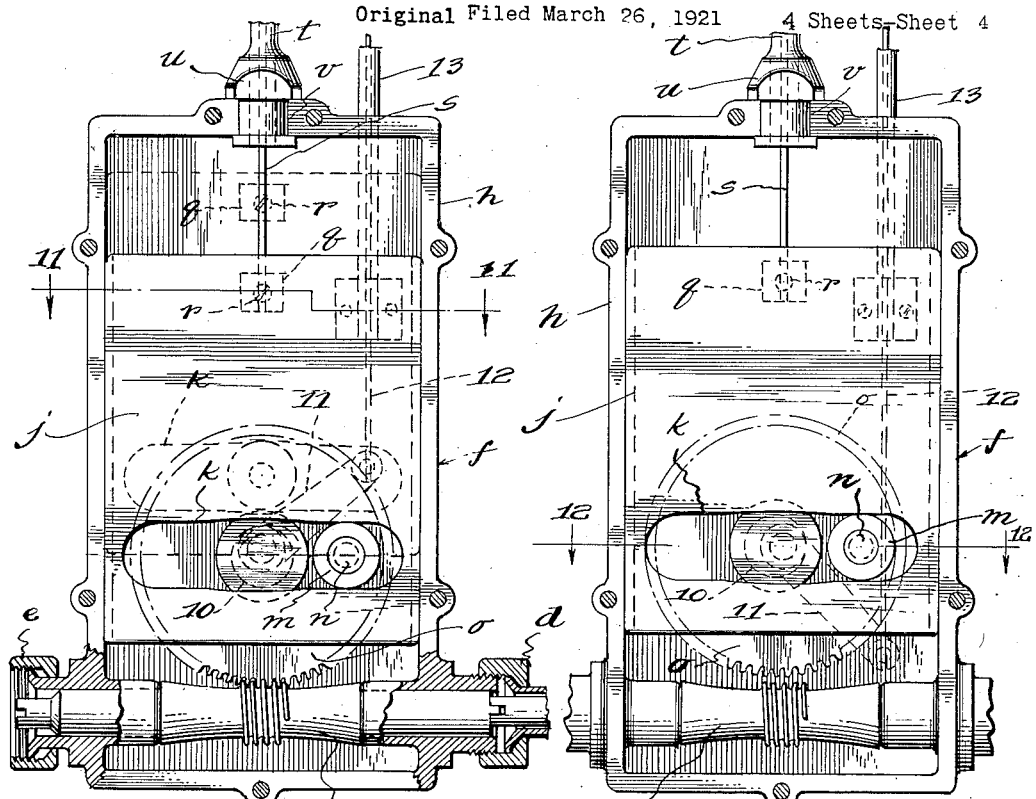

1,553,621

UNITED STATES PATENT OFFICE.

CHARLES R. LOCKLIN, OF DETROIT, MICHIGAN.

AUTOMATIC WINDSHIELD WIPER.

Continuation in part of application Serial No. 456,028, filed March 26, 1921. This application filed February 26, 1923. Serial No. 621,200.

*To all whom it may concern:*

Be it known that I, CHARLES R. LOCKLIN, a citizen of the United States, residing at Detroit, in the county of Wayne and State of Michigan, have invented certain new and useful Improvements in Automatic Windshield Wipers, of which the following is a specification.

This invention relates to automatic wind shield wipers and has for its object an automatic wind shield wiper that is positively and silently driven from a moving part of the car. It is not broadly new to drive wind shield wipers automatically from a moving part of the car. Various forms of rotary flexible shafts have been proposed for this purpose and also suction operated wipers. The flexible rotary shaft is open to the objection of being large and unsightly and also noisy. Furthermore, the flexible shaft is easily broken, especially when the grease in the tubing congeals. The suction operated wiper is also open to numerous infirmities such as air leaks and the like which quickly put it out of operation and the liability to quit operating when it meets resistance. It has very little power and will not ordinarily clean the panel of accumulated ice in a sleet storm. It has also been proposed to drive automatic wipers electrically.

Another feature of this wiper is, that as the oscillating wiper reaches the end of its arc of movement the speed of the wiper gradually decreases and the force increases. This is due to the crank form of motion translating device on the transmission hereinafter to be described. This is a great advantage for the reason that it lessens the strain on the wiper parts for it is at the end of the swinging arc where the wind shield wiper always meets the greatest resistance. The snow and ice accumulate ahead of the wiper at these points and the whole accumulation has to be pushed forward before them. A suction operated wiper will be stopped by such accumulation. Of course, the mechanically power operated wiper connected with the transmission of the car cannot be stopped but if the wiper is traveling rapidly at the end of the stroke the resistance may be great enough to break the parts or bend them.

The present wiper has all the advantages of a mechanical wiper but eliminates most of the disadvantages by employing a reciprocating, slowly driven, flexible, linear member for transmitting the motion from the moving part of the car to the wiper. Preferably, the reciprocating transmission member is connected to a rotating part of the car. The wiper is an oscillating wiper, consequently, I employ suitable motion translating devices, both at the driving end and at the driven end of the flexible transmission.

In the drawings:

Fig. 1 is a fragmentary vertical, longitudinal section through the front part of a closed body showing the wind shield wiper installation.

Fig. 2 is a transverse cross section through the car showing the installation.

Fig. 3 is a fragmentary inside elevation of the upper part of the wind shield panel showing the wiping instrument.

Fig. 4 is a section on line 4—4 of Fig. 3.
Fig. 5 is a section on line 5—5 of Fig. 3.
Fig. 6 is a section on line 6—6 of Fig. 3.
Fig. 7 is a perspective of the operating rack.

Fig. 8 is a cross section of the front post.
Fig. 9 is an elevational view of the motion translating device on the transmission box.

Fig. 10 is a similar view showing the motion translating device disconnected.

Fig. 11 is a section on line 11—11 of Fig. 9.

Fig. 12 is a section on line 12—12 of Fig. 10.

Fig. 13 is a section on line 13—13 of Fig. 12.

In my prior application No. 456,028 filed March 26, 1921, I have described a wind shield wiper that works on the same general principle as the one herein described, and this application is a continuation in part of that application. However, the claims in the application referred to have been limited to the motion translating device located at the driving end of the reciprocating, flexible, wire, transmission.

The present application is drawn to the concept of an automatic, mechanically driven wind shield wiper of an improved type. The improvement consists in providing a slow but forceful, flexible push and pull transmission between the wiper and the moving part of the car. This wiper decreases its speed at the end of the stroke but increases the force of its operation. A device of this kind is absolutely new in the automatic wind shield wiper art and makes a very much improved device of this kind by reason of the slow but forceful transmission being practically noiseless and at the same time having a great but slow force to overcome any accumulations on the shield that might otherwise stop the wiper or break the transmission. Furthermore, a transmission of this kind can be installed in a very small flexible tube leading from the transmission box to the upper channel of the wind shield panel. This tubing may be easily concealed in the trimming. The sharp turns can be taken by a push and pull transmission running at a slow speed without giving an objectionable noise or resulting in breakage of the transmission line, which is so common with the flexible chain type of rotary drive.

A further advantage is that in employing a push and pull reciprocating transmission member, the motion translating device on the wind shield is much simpler than is the case where it is necessary to translate a rotary motion into an oscillating motion. In order to make the last mentioned translation it is necessary ordinarily to use some form of special crank arrangement which requires considerable space to contain and house the parts. In translating the reciprocatory into the oscillating motion, all that is necessary is to use a sliding rack and rotary pinion. This enables me to incorporate the upper motion translating device directly in the wind shield channel as is explained and claimed in my co-pending application No. 622,963.

Referring to Figs. 1 and 2, $a$ designates the ordinary sliding gear change speed transmission used on practically every car outside of the Ford. The installation here shown is one used on the well known Cadillac car, although of course, it can be applied to any make of car. In a car such as referred to, the speedometer drive $b$ enters the transmission box at $c$. The usual flexible tube having a flexible rotatable speedometer shaft is employed. In place of connecting up the union nut $d$ directly with the nipple $c$, leading out of the transmission case, a coupling nut $e$ screws on to this nipple. This coupling nut $e$ is part of the lower motion translating device box $f$.

This box $f$ is detailed in Figs. 9 to 13 inclusive, and comprises simply a casting $h$ provided with a cover in the form of a plate $i$ secured on by screws. A channel slide $j$ is provided with a slot $k$ adapted to receive the roller $m$ carried by the crank pin $n$ on the worm gear $o$. The lower end of the motion translating device box journals a worm $p$. This worm $p$ is provided with a suitable key and keyway to fit into the driving member in nipple $c$ and into the end of the speedometer transmission shaft. Obviously when this worm rotates, it turns the worm gear $o$ at a very much reduced rate of speed (about 32 to 1). This worm being connected by a crank pin and slide arrangement with the slide $j$, this slide is reciprocated slowly but with power working with considerable leverage. In short, the rapid turning movement of the worm or speedometer shaft is converted into a very slow but forceful movement of the slide.

Secured to the slide by the block and set screws $q$ and $r$ is the flexible linear transmitting member or wire $s$. This is carried in a small diameter tube $t$ which is provided with a special collared fixture $u$ on its end, which can be slid into the slot $v$ on the housing $h$ when the cover plate $i$ is removed from the housing of the motion translating device box. This tube $t$ extends up over the transmission box to which it is secured by a clip $w$, thence up through the floor boards along the front face of the L section post. It is here concealed in a groove that can be cut out of the post and covered up by the trimming when this is in place. The tube then turns and runs along the top of the channel of the wind shield panel (see Fig. 2 and Fig. 8); the upper end of the tube is secured in a wiper housing $x$. This wiper housing is made up of a channel strip $y$ (Fig. 5) and a cover plate $z$ secured thereto by the screws 1. This housing together with the channel strip of the wind shield journals the stud 2, having a squared central portion on which is fitted the pinion 3. The other end of the stud carries the wiper arm 4, which is a spring arm to which its attached a clip 5, which carries the channel back 6 of the wiper. The wiper has a rubber wiping strip 7.

The end of the flexible wire is secured by a set screw 8 to the rack 9, which has teeth which engage with the teeth of the pinion 3. The rack is guided in the channel and cover plate. The wiper, housing, rack and pinion form a simple upper motion translating device that converts the slow but forceful movement of the reciprocating wire into a slow and forceful oscillating movement of the wiper across the wind shield.

The crank pin and slide arrangement works on the principle of accelerating from the end of the stroke to the center of the stroke of the cross head, but on a decelerating plan from the centre of the stroke to the end of the stroke. The consequence is that as the cross head or slide reverses, the movement of the slide is very much slower but with greater mechanical advantage. This slowing up of the cross head at the end of the stroke is transmitted by the wire and to the wiper, and results in slowing up the oscillating wiper at the ends of the stroke and gives it very much better capacity to handle large accumulations of ice and snow without breaking or bending the parts as explained in the introduction.

A very great advantage of this type of wiper and transmission over the flexible rotary transmission is that a very large speed reduction (32 to 1) is secured which results in a larger mechanical advantage in overcoming resistance. This is calculated to be very much less strain on the wiper and the transmission parts when resistance is met, consequently neither wiper nor transmission parts are nearly as liable to break. Furthermore, flexible transmission shafts of the rotary type are always more or less noisy. Any one can verify this who has driven a car and observed the noise that often emanates from the speedometer shaft. With a slow action transmission in which the wire is pulled and pushed, there is no noise at all audible. The rack and pinion and the wire can be covered with graphite and it will be as silent as it is possible to make transmissions. This is a very important factor when it is remembered that this is a very long transmission shaft and involves in this installation, three separate curves. Furthermore, a rack and pinion can be used to translate the reciprocating motion into the oscillating motion of the wiper. This is a very great advantage as will be apparent from my co-pending application, where the rack and pinion are wholly embodied in the ordinary wind shield channel making a very neat and efficacious installation.

Another very important feature of this transmission is the power disconnecting device. By employing the slide or cross head $j$ it is possible to simply lift the worm wheel $o$ out of engagement with the worm $p$ as shown in Fig. 10. This is secured by journalling the worm wheel on the eccentric shaft 10. This shaft is connected with the lever 11 which is secured to the flexible pull shaft 12 that runs in the tube 13 up to the instrument board 15, where a pull button 16 is employed. This form of power disconnecting device cooperates nicely with the type of transmission for the slide $j$ can easily yield to permit the necessary movement in lifting the worm gear $o$ out of engagement with the worm $p$. Hence, when it is desired that the wiper not operate, all that is necessary to do is to push on the button 16, that has been pulled out when operating the wiper and this shifts the worm gear and the wiper slightly to permit this movement, and the wiper is wholly disconnected from the drive. When it is desired to remove the lower motion translating device, all that is necessary to do is to take off the cover plate $i$, and the tube $b$ together with the channel-like slide $j$ may be removed.

I am aware that the push and pull wire encased in a short tube has been proposed to pull and push a sliding wiper from one side to the other of a wind shield panel. This, however, was a hand operated affair and really embodied no problem of transmitting a continuous power driven movement from one point of the car to the wiper under such circumstances as to avoid such strains as would break the transmission or to avoid the noise ordinarily incident to transmission of machine power. The wiper to which I refer is simply pushed and pulled across the panel. Obviously the flexible wire was used as a direct power transmission means from the hand of the operator to the wiper. My concept involves the use of two motion translating devices connected by a reciprocating, flexible wire transmission for advantages and results in no way suggested by the construction referred to.

What I claim is:

1. In a wind shield wiper for a vehicle having a moving part and a windshield, the combination of a wiper mounted on the wind shield, and a flexible, linear transmission member connected up with the wiper and the moving part of the vehicle so as to be automatically driven in reciprocating movement to operate the wiper.

2. In a wind shield wiper, for a vehicle provided with a rotating part and a wind shield, the combination of a wiper mounted on the wind shield, a device for translating rotary motion into reciprocating motion connected with the rotary part of the vehicle, and a flexible, linear reciprocating member for transmitting motion from such translating device to the wind shield wiper to operate the same.

3. In a wind shield wiper, for a vehicle provided with a rotating part and a wind shield, the combination of a wiper mounted on the wind shield to oscillate, a motion translating device for converting reciprocating motion into oscillatory motion and connected with said wiper, a second motion translating device for converting rotary motion into reciprocating motion connected with the rotary part of the vehicle, and a flexible, linear reciprocating transmission member for connecting the two motion translating devices.

4. In a wind shield wiper, for a vehicle having a rotating part and a wind shield, the combination of a wiper supported by the wind shield and arranged to oscillate through an arc, a motion translating device for converting reciprocating motion into oscillating motion and connected with the wiper to operate the same, a second motion translating device connected with the rotary part of the vehicle to convert the rotary motion into reciprocating motion, a flexible wire for transmitting the reciprocating motion from one translating device to the other, and a tube for encasing said wire and guiding the same.

In testimony whereof I affix my signature.

CHARLES R. LOCKLIN.